United States Patent Office 3,790,531
Patented Feb. 5, 1974

3,790,531
HIGH MOLECULAR WEIGHT LINEAR COPOLY-AMIDES CONTAINING OXAMIDE GROUPS
Geert Christoph, Eduard Radlmann, and Gunther Nischk, Dormagen, Germany, assignors to Bayer Aktiengesellschaft, Leverkusen, Germany
No Drawing. Filed Nov. 26, 1971, Ser. No. 202,671
Claims priority, application Germany, Nov. 27, 1970, P 20 58 414.9
Int. Cl. C08g 20/20, 20/06
U.S. Cl. 260—78 R     3 Claims

ABSTRACT OF THE DISCLOSURE

New copolyamides which are obtained by cocondensation of dicarboxylic acids containing oxamide groups, certain diamines, and aliphatic dicarboxylic acids and hexamethylene diamine, or a lactam. The copolyamides are useful for the production of filaments and films.

---

This invention relates to copolyamides containing aliphatic oxamide groups which are obtained by the melt condensation of aliphatic diamines with dicarboxylic acids containing oxamide groups and lactams, such as caprolactam or lauric lactam or hexamethylene diamine and aliphatic dicarboxylic acids.

It is known that polyoxamides can be obtained from oxalic esters and diamines. The production of a polyamide containing oxamide groups from oxalyl-bis-ε-amino caproic acid and hexamethylene diamine is also described in the literature.

It is an object of this invention to provide a novel high molecular weight linear copolyamide with oxamide segments which comprises from 1 to 99 mol percent of recurring structural elements of the general formula

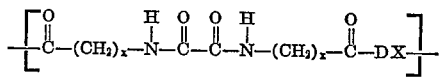

and from 99 to 1 mol percent of structural elements of the general formula

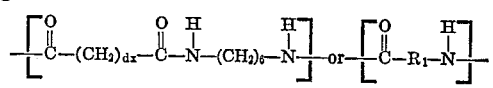

in which $dx$ represents a radical of the general formula

—NH—R—NH—

(in which R represents a linear alkylene radical, a branched alkylene radical or a 1,4-cyclohexylene radical), or a radical of the formula

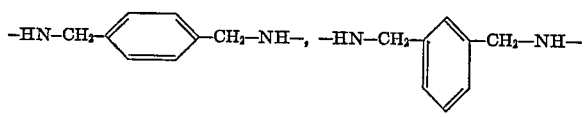

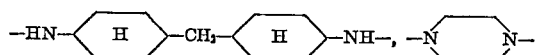

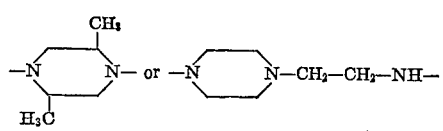

$x$ represents an integer from 5 to 10,
$dx$ represents an integer from 4 to 10, and
$R_1$ represents a linear or branched alkylene radical containing 3 to 20 carbon atoms, said copolyamide having a relative solution viscosity $\eta_{rel}$ of from 1.1 to 4.0 (as measured on a solution of 1 g. of substance in 100 ml. of m-cresol at 25° C.).

To prepare these copolyamides containing oxamide groups, from 1 to 99 mol percent of a stoichiometric mixture of an oxamide dicarboxylic acid, corresponding to the general formula

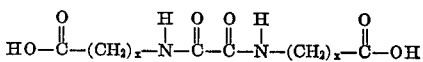

and a diamine of the general formula

H—DX—H or the corresponding salt of the general formula

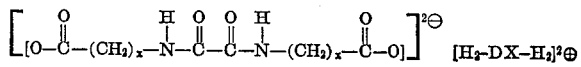

in which

DX represents a radical of the general formula

HN—R—NH—

(in which R represents a linear or branched alkylene radical, or a 1,4-cyclohexylene radical) or a radical of the formula

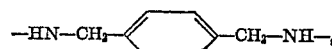

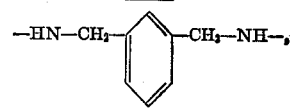

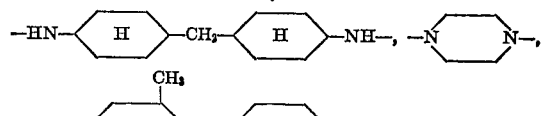

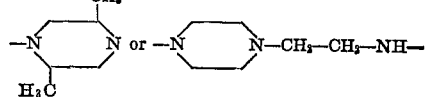

and $x$ represents an integer from 5 to 10, is or are polycondensed with 99 to 1 mol percent of a stoichiometric mixture of a dicarboxylic acid of the general formula

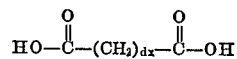

and hexamethylene diamine or of the corresponding salt of the general formula

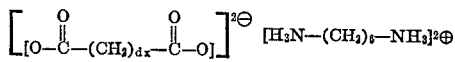

in which $dx$ represents an integer from 4 to 10, or of a lactam corresponding to the general formula

in which $R_1$ represents a linear or branched alkylene radical with 3 to 20 carbon atoms, said polycondensing being effected in the melt, in the absence of oxygen and in an inert gas atmosphere, at a temperature of from 100 to 350° C. and at a pressure of from normal pressure to 0.001 torr.

The copolyamides thus obtained can readily be processed from the melt to form shaped articles, especially filaments and films.

The dicarboxylic acids containing oxamide groups used in the production of the new copolyamides can be obtained by known methods (cf. United States patent specification No. 2,954,364, Canadian patent specification No. 604,055, and United States patent specification No. 2,356,702) from oxalic esters or oxalyl chloride and amino carboxylic acids in a molar ratio of 1:2. The compounds

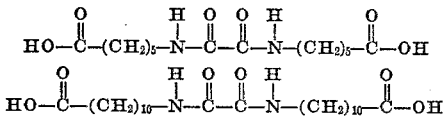

are examples of such dicarboxylic acids.

The following diamines can, for example, be used for salt formation with the oxamide dicarboxylic acids by known methods:

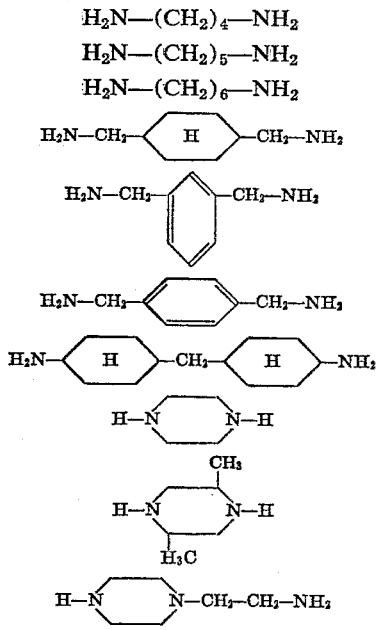

The following are examples of lactams of the general formula

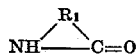

suitable for co-condensation: ε-caprolactam, γ-methyl-ε-caprolactam and lauric lactam.

In a preferred embodiment of the process according to the invention, polycondensation is carried out by heating the mixture of components with stirring, under normal pressure, to a temperature of from 100 to 350° C. over a period ranging from 10 minutes to 4 hours in the presence of an inert gas for example, nitrogen, hydrogen or helium. Dicarboxylic acids and diamines are preferably used in equivalent quantities, although, to adjust a particular molecular weight, one of the components can be used in excess or, alternatively, a monofunctional compound can even be used. It is surprising in this connection that such an excess of a bifunctional compound or the addition of a monofunctional compound in a quantity of up to 10 mol percent still leads to melts which can be drawn into satisfactory filaments. Following precondensation, the pressure is reduced, generally to below 15 torr, preferably to below 1 torr. Polycondensation is continued under these conditions for from 15 minutes to 10 hours until the required melt viscosity is obtained. On completion of polycondensation, the copolyamide formed can be immediately processed from the melt into shaped articles such as films, filaments or other shaped structures.

The novel copolyamides containing oxamide groups are distinguished by their outstanding natural color, by their satisfactory mechanical and thermal properties and also by their outstanding processability.

The relative solution viscosities $\eta_{rel}$ quoted in the following examples which are to further illustrate the invention without limiting it were measured at 25° C. on solutions of 1 g. of substance in 100 ml. solution in m-cresol.

The parts by weight relate to parts by volume as kg. to litres.

EXAMPLE 1

An oxygen-free nitrogen stream is passed into a 250 ml. 3-necked flask equipped with a metal stirrer, gas inlet pipe and distillation bridge, containing a mixture of 47.2 parts by weight of hexamethylene diammonium adipate (AH-salt) and 27.1 parts by weight of the ω,ω-p-xylylene diamine salt of oxamide-N,N'-bis-caproic acid over a metal bath heated to 275° C. A vigorous evolution of water begins immediately. Condensation is continued at 275 to 280° C. for a period of 10 minutes, after which the contents of the flask have fused to form a clear colorless low-viscosity liquid. The temperature is increased to 305° C. with gradual stirring, accompanied by a gradual increase in the viscosity of the melt. The melt is held at 305 to 310° C. for 10 minutes, after which a vacuum is applied and condensation is continued for 10 minutes at 310° C./14–16 torr and then for another 5 to 10 minutes at the same temperature under a pressure of 0.1–1 torr. An extremely highly-viscous pale yellow colored melt is obtained, from which filaments of high strength and excellent natural color, which can readily be stretched under heat, are drawn. Softening point 200° C. $\eta_{rel}$: 2.61.

EXAMPLE 2

Under the same reaction conditions as in Example 1, 52.4 parts by weight of AH-salt and 20.9 parts by weight of the 1,5-diaminopentane salt of oxamide-N,N'-bis-caproic acid are condensed under nitrogen for 15 minutes at 250° C. and then for 15 minutes at 275° C. under normal pressure. Thereafter a vacuum is applied and condensation is continued for 15 minutes at 275° C./15 torr and for 40 minutes at 275° C./2–2.5 torr. Thereafter the polycondensate constitutes a highly viscous melt, pale yellow in color, from which strong filaments that are readily stretchable under heat can be drawn. Softening point 192° C. $\eta_{rel}$: 2.41.

EXAMPLE 3

Under the same conditions as in Example 1, 41.9 parts by weight of AH-salt and 32.3 parts by weight of the 1,4-diaminobutane salt of oxamide-N,N'-caproic acid are condensed under nitrogen for 30 minutes at 250° C./normal pressure, for 15 minutes at 250° C./18 torr and for 235 minutes at 250–255° C./0.2–0.5 torr. A very highly viscous melt with good filament-forming properties is obtained. The filaments of outstanding strength can readily be stretched both when cold and when warm. Softening point 175–176° C. $\eta_{rel}$: 2.39.

EXAMPLE 4

In the apparatus described in Example 1, 26.6 parts by weight of AH-salt and 24.8 parts by weight of the 2,5-dimethyl piperazine salt of oxamide-N,N'-bis-undec-anoic acid were heated for 15 minutes at 180° C., for 15 minutes at 210° C., for 30 minutes at 250–255° C. and for 30 minutes at 275–280° C. under normal pressure. Following the application of a vacuum, condensation was continued for 30 minutes at 280° C./18 torr and for another 130 minutes at 275–280° C./4–5 torr. A highly viscous melt is obtained from which almost colorless and very strong filaments, readily stretchable both when cold and under heat, can be drawn. Softening point 179–186° C., $\eta_{rel}$: 2.15.

The oxamide-N,N'-bis-undecanoic acid required for salt formation is prepared by the following procedure:

A mixture of 146 parts by weight of diethyl oxalate and 442 parts by weight of 11-amino-undecanoic acid is heated for 2 to 3 hours at 175–180° C. in an oxygen-free stream of nitrogen in a 1-litre 3-necked flask equipped with stirring mechanism, gas inlet pipe and distillation bridge until 116 parts by volume of ethanol have distilled off. The resulting clear melt is poured onto ice, the deposit formed is filtered off under suction, and is size-reduced in a mixer to which water is added or in a mill after previous drying. After drying, oxamide-N,N'-bis-undecanoic acid melting at 138–141° C. is obtained in a yield of 90 to 98%.

EXAMPLE 5

52.4 parts by weight of AH-salt and 29.2 parts by weight of the N-(2-aminoethyl)-piperazine salt of oxamide-N,N'-bis-undecanoic acid are condensed in the apparatus described in Example 1 for 15 minutes at 180° C., for 30 minutes at 250° C. and for 30 minutes at 280° C. Under reduced pressure, the product is then kept for 15 minutes at 275° C./15 torr and for 30 minutes at 275–280°C./1.8–1.3 torr. A highly viscous melt with good filament-forming properties is formed. The filaments obtained can readily be stretched, both when cold and under heat. Softening point 205–207° C., $\eta_{rel}$: 2.40.

EXAMPLE 6

6.55 parts by weight of AH-salt and 59.2 parts by weight of the ω,ω'-m-xylylene diamine salt of oxamide-N,N'-bis-undecanoic acid are condensed in the apparatus described in Example 1 for 15 minutes at 260° C. and for 25 minutes at 275° C. under normal pressure, and then for 15 minutes at 275° C./17 torr and for 65 minutes at 275° C./1 torr: The product is a highly viscous melt with good filament forming properties, from which can be drawn, substantially colorless filaments of high strength and gloss, which can readily be stretched both when cold and under heat. Softening point 130–136° C., $\eta_{rel}$: 2.02.

EXAMPLE 7

In the apparatus described in Example 1, 52.5 parts by weight of hexamethylene diammonium sebacate (SH-salt) and 17.4 parts by weight of the bis-(4-aminocyclohexyl)-methane salt of oxamide-N,N'-bis-caproic acid are heated for 30 minutes at 220° C. and for 15 minutes at 250° C. under normal pressure and then for 15 minutes at 250° C./14–13 torr and for 235 minutes at 250° C./0.3 torr. A highly viscous clear melt is formed from which strong filaments of outstanding strength and natural color, readily stretchable both when cold and under heat, can be drawn. Softening point 215° C., $\eta_{rel}$: 1.92.

EXAMPLE 8

Following the procedure of Example 1, 47.7 parts by weight of SH-salt and 21.5 parts by weight of the 1,4-diaminocyclohexane salt of oxamide-N,N'-bis-caproic acid are condensed for 20 minutes at 250° C. and for 15 minutes at 275° C. under normal pressure and then for 15 minutes at 275–280° C./22–21 torr and for 150 minutes at 275–280° C./0.5–0.2 torr. Readily, stretchable, strong filaments with a softening point of 192° C. can be drawn from the high viscous melt which is obtained, $\eta_{rel}$: 2.07.

EXAMPLE 9

31.1 parts by weight of the 1,6-diaminohexane salt of decan-1,10-dicarboxylic acid (referred to hereinafter as the DH-salt) and 38.9 parts by weight of the 1,6-diamino-hexane salt of oxamide-N,N'-bis-caproic acid are condensed under nitrogen in the apparatus described in Example 1 for 60 minutes at 210–215° C. and for 15 minutes at 250–255° C. under normal pressure, for 15 minutes at 255° C./20 torr and for 90 minutes at 250–255° C./1.5–0.3 torr. Extremely strong filaments of high gloss and with a good natural color, readily stretchable both cold and under heat, can be drawn from the highly viscous pale yellow colored melt. Softening point 178–180° C. $\eta_{rel}$: 2.21.

EXAMPLE 10

Under the conditions of Example 1, 6.9 parts by weight of DH-salt and 57.2 parts by weight of the 1,6-diamino-hexane salt of oxamide-N,N'-bis-undecanoic acid are heated for 60 minutes at 215–220° C. and for 15 minutes at 250–255° C. Condensation is continued for 15 minutes at 250° C./15–21 torr and for 300 minutes at 250° C./1–0.5 torr, so that a highly viscous substantially colorless melt is obtained from which filaments of high strength and gloss, readily stretchable both when cold and when warm, can be drawn. Softening point 148–150° C. $\eta_{rel}$: 2.32.

EXAMPLE 11

67.9 parts by weight of ε-caprolactam and 24.1 parts by weight of the piperazine salt of oxamide-N,N'-bis-caproic acid are condensed under nitrogen in the apparatus described in Example 1 for 60 minutes at 250–255° C. and for another 340 minutes at 275–280° C. under normal pressure. A slightly colored highly viscous melt is formed from which can be drawn filaments which are readily stretchable both when cold and when warm. Softening point 197° C. $\eta_{rel}$: 2.22.

EXAMPLE 12

Following the procedure of Example 1, 1.7 parts by weight of ε-caprolactam and 64.8 parts by weight of the 1,6-diamino-hexane salt of oxamide-N,N'-bis-caproic acid are subjected to melt condensation for 60 minutes at 250–255° C. and for 75 minutes at 275–280° C. Readily stretchable, extremely strong filaments can be drawn from the almost colorless highly viscous melt. Softening point 179–183° C., $\eta_{rel}$: 2.37.

EXAMPLE 13

In the apparatus described in Example 1, 52.4 parts by weight of AH-salt and 19.0 parts by weight of the salt of trimethyl hexamethylene-1,6-diamine (mixture of 50% each of the 2,2,4- and 2,4,4-isomers) and oxamide-N,N'-bis-caproic acid are condensed under nitrogen for 15 minutes at 250° C. and for 15 minutes at 275° C. under normal pressure, for 15 minutes at 275–280° C./20 torr. and for another 155 minutes at 280° C./0.8–0.2 torr. A highly viscous melt from which strong filaments readily stretchable under heat can be drawn, is obtained. Softening point 194–196° C. $\eta_{rel}$: 2.205.

EXAMPLE 14

1.152 parts by weight of N-(3-aminopropyl)-morpholine are added to 41.9 parts by weight of AH-salt and 21.1 parts by weight of the bis-(4-aminocyclohexyl)-methane salt of oxamide-N,N'-bis-caproic acid, and the resulting mixture, as in Example 1, is held under nitrogen for 60 minutes at 215–220° C. and for 15 minutes at 250° C. under normal pressure, for 15 minutes at 280° C./14–11 torr and for 210 minutes at 280° C./0.5–1.5 torr. The highly viscous pale yellow colored melt with outstanding filament-forming properties that is produced forms readily stretchable strong filaments with a softening point of 198–199° C. $\eta_{rel}$: 2.29.

EXAMPLE 15

In the apparatus described in Example 1, 23.4 parts by weight of adipic acid, 18.6 parts by weight of 1,6-diamino-hexane, 8.4 parts by weight of bis-(4-aminocyclohexyl)-methane, 12.6 parts by weight of oxamide-N,N'-bis-caproic acid and 2.02 parts by weight of sebacic acid are heated under nitrogen for 15 minutes at 190° C.–200° C. and for 45 minutes at 215–220° C. under normal pressure, for 15 minutes at 250–255° C./16–17 torr and for 255 minutes at 250–255° C./0.7–0.5 torr. At the end of this time, a highly viscous almost colorless melt is formed from which readily stretchable filaments of high strength can be drawn. Softening point 206–216° C. $\eta_{rel}$: 2.19.

What we claim is:
1. A high molecular weight linear copolyamide which consists essentially of from 1 to 99 mol percent of units of the general formula

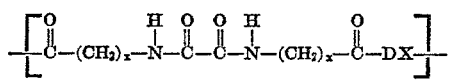

and from 99 to 1 mol percent of units of the general formula

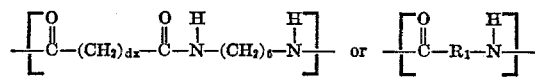

in which $dx$ represents a radial of the general formula

in which R represents a linear alkylene radical, a branched alkylene radical or a 1,4-cyclohexylene radical or a radical of the formula

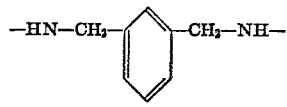

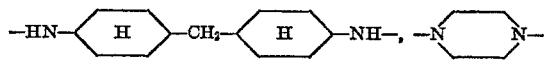

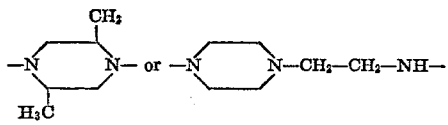

$x$ represents an integer from 5 to 10;

$dx$ represents an integer from 4 to 10; and $R_1$ represents a linear or branched alkylene radical containing 3 to 20 carbon atoms;

said copolyamide having a relative solution viscosity of from 1.1 to 4.0 as measured on a solution of 1 g. of substance in 100 ml. of m-cresol at 25° C.

2. A filament consisting essentially of the composition of claim 1.

3. A film consisting essentially of the composition of claim 1.

References Cited
UNITED STATES PATENTS

| | | | |
|---|---|---|---|
| 2,356,702 | 8/1944 | Schlack | 260—78 R |
| 2,756,257 | 7/1956 | Stamatoff | 260—78 L |
| 2,945,011 | 7/1960 | Caldwell et al. | 260—78 R |
| 2,954,364 | 9/1960 | Coleman et al. | 260—75 N |

HAROLD D. ANDERSON, Primary Examiner

U.S. Cl. X.R.

260—33.4 R, 78 A, 78 L, 78 S, 561 R; 264—176 F